US012407997B2

(12) United States Patent
Barreiro et al.

(10) Patent No.: US 12,407,997 B2
(45) Date of Patent: Sep. 2, 2025

(54) AUDIO PERSONALISATION METHOD AND SYSTEM

(71) Applicant: Sony Interactive Entertainment Inc., Tokyo (JP)

(72) Inventors: Marina Villanueva Barreiro, London (GB); Calum Armstrong, London (GB); Danjeli Schembri, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 316 days.

(21) Appl. No.: 18/246,938

(22) PCT Filed: Sep. 15, 2021

(86) PCT No.: PCT/GB2021/052387
§ 371 (c)(1),
(2) Date: Mar. 28, 2023

(87) PCT Pub. No.: WO2022/069863
PCT Pub. Date: Apr. 7, 2022

(65) Prior Publication Data
US 2023/0413005 A1 Dec. 21, 2023

(30) Foreign Application Priority Data
Oct. 1, 2020 (GB) ..................................... 2015595

(51) Int. Cl.
*H04S 7/00* (2006.01)
*H04R 1/10* (2006.01)

(52) U.S. Cl.
CPC .......... *H04S 7/303* (2013.01); *H04S 2420/01* (2013.01)

(58) Field of Classification Search
None
See application file for complete search history.

(56) References Cited

U.S. PATENT DOCUMENTS 10,070,239 B2 * 9/2018 Romigh .................. H04S 1/002
11,245,999 B2 2/2022 Kim
(Continued)

FOREIGN PATENT DOCUMENTS

CN 108540925 A 9/2018
KR 20190034487 A 4/2019
(Continued)

OTHER PUBLICATIONS

Combined Search and Examination Report for corresponding GB Application No. GB2015595.8, 6 pages, dated Mar. 25, 2021.
(Continued)

*Primary Examiner* — Qin Zhu
(74) *Attorney, Agent, or Firm* — Kilpatrick Townsend & Stockton LLP

(57) ABSTRACT

An audio personalisation method for a first user includes: testing a first user on a calibration test, the calibration test comprising requiring a user to match a test sound to a test location, either by controlling the position of the presented sound or controlling the position of the presented location, for a sequence of test matches, each test sound being presented at a position using a default head related transfer function 'HRTF', receiving an estimate of each matching location from the first user, and calculating a respective error for each estimate, to generate a sequence of location estimate errors for the first user; and comparing at least some of the location estimate errors for the first user with estimate errors of the same locations previously generated for at least a subset of a corpus of reference individuals; identifying a reference individual with the closest match of compared location estimation errors to those of the first user; and using an HRTF, previously obtained for the identified reference individual, for the first user.

16 Claims, 7 Drawing Sheets

(56) References Cited

U.S. PATENT DOCUMENTS

| | | | |
|---|---|---|---|
| 2018/0310115 | A1 | 10/2018 | Romigh |
| 2021/0176577 | A1 | 6/2021 | Kim |

FOREIGN PATENT DOCUMENTS

| | | | | | |
|---|---|---|---|---|---|
| WO | 2019059558 | A1 | | 3/2019 | |
| WO | WO-2021045869 | A1 | * | 3/2021 | ............. H04R 1/403 |

OTHER PUBLICATIONS

International Search Report and Written Opinion for corresponding PCT Application No. PCT/GB2021/052387, 20 pages, dated Jan. 4, 2022.

Frantisek Rund, et al., “Alternatives to HRTF measurement,” Telecommunications and Signal Processing, 2012 35th International Conference on IEEE, pp. 648-652, dated Jul. 3, 2012.

* cited by examiner

AUDIO PERSONALISATION METHOD AND SYSTEM

BACKGROUND OF THE INVENTION

Field of the Invention

The present invention relates to an audio personalisation method and system.

Description of the Prior Art

Consumers of media content, including interactive content such as videogames, enjoy a sense of immersion whilst engaged with that content. For pre-recorded content there is a tacit understanding that this content is fixed, but for video and audio. However, for interactive content such as in a videogame, where the content and the viewpoint for that content generally change with the user's inputs, there is a desire for audio to be similarly responsive.

The present invention seeks to mitigate or alleviate this need.

SUMMARY OF THE INVENTION

Various aspects and features of the present invention are defined in the appended claims and within the text of the accompanying description and include at least:

In a first aspect, an audio personalisation method for a first user is provided in accordance with claim 1.

In another aspect, an audio personalisation method for reference individuals is provided in accordance with claim 2.

In another aspect, an audio personalisation system for a first user is provided in accordance with claim 15.

In another aspect, an audio personalisation system for reference individuals is provided in accordance with claim 16.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An audio personalisation method and system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a suitable system and/or platform for implementing the methods and techniques herein may be an entertainment device such as the Sony PlayStation® 4 or 5 videogame consoles.

For the purposes of explanation, the following description is based on the PlayStation 4® but it will be appreciated that this is a non-limiting example.

Figure 1:
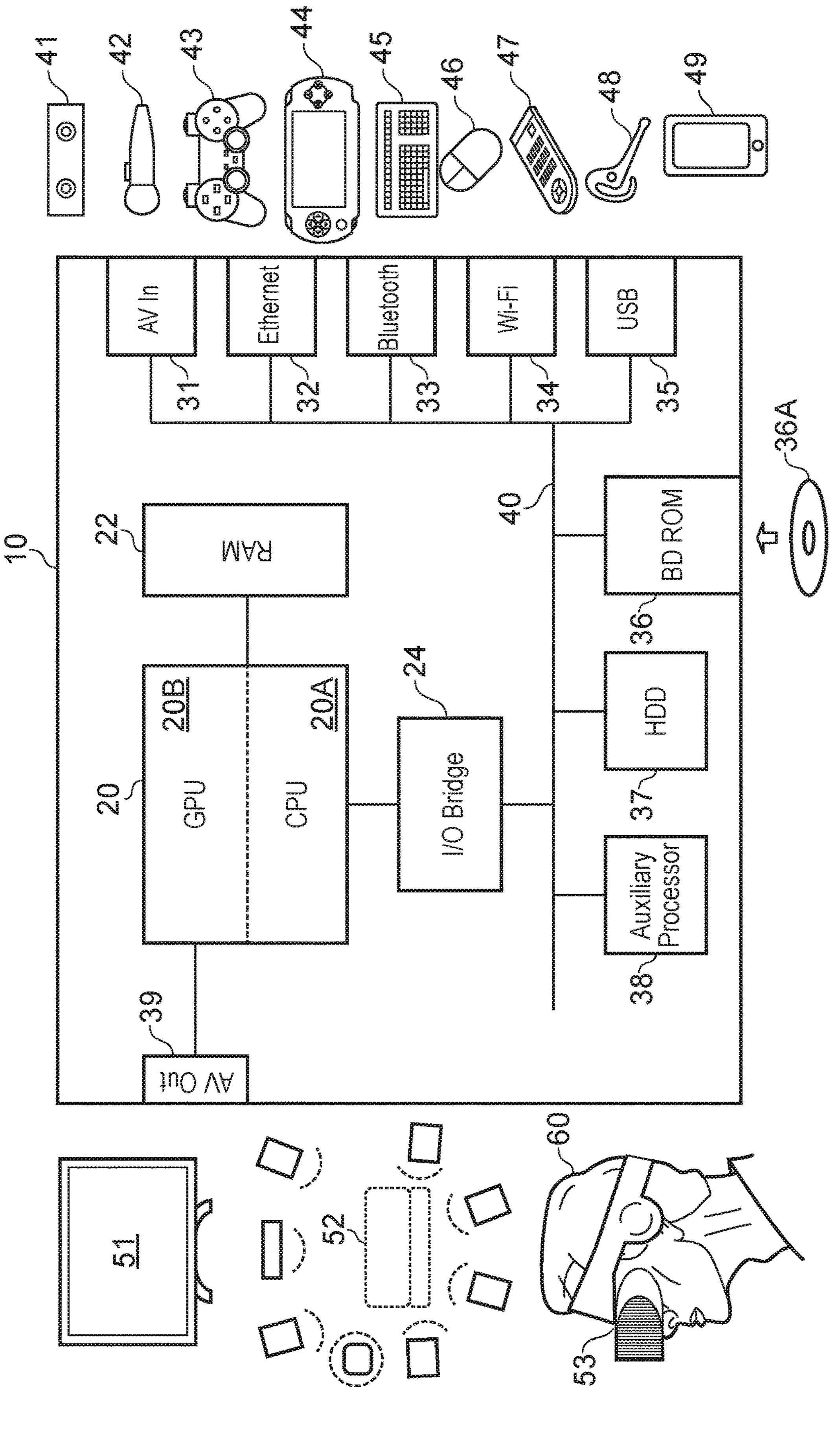
FIG. 1 is a schematic diagram of an entertainment device in accordance with embodiments of the present description.

Referring now to the drawings, wherein like reference numerals designate identical or corresponding parts throughout the several views, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD® 9.0. The operating system may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

When playing such games, or optionally other content, the user will typically be receiving audio from a stereo or surround sound system 52, or headphones, when viewing the content on a static display 51, or similarly receiving audio from a stereo surround sound system 52 or headphones, when viewing content on a head mounted display ('HMD') 53.

In either case, whilst the positional relationship of in game objects either to a static screen or the user's head position (or a combination of both) can be displayed visually with relative ease, producing a corresponding audio effect is more difficult.

This is because an individual's perception of direction for sound relies on a physical interaction with the sound around them caused by physical properties of their head; but everyone's head is different and so the physical interactions are unique.

Figure 2A:
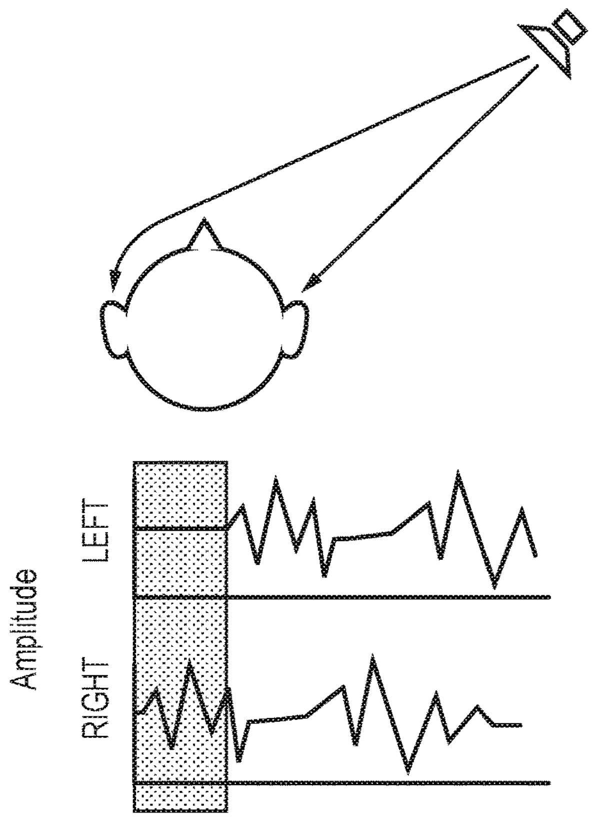
FIGS. 2A and 2B are schematic diagrams of head related audio properties.

Referring to FIG. 2A, an example physical interaction is the interaural delay or time difference (ITD), which is indicative of the degree to which a sound is positioned to the left or right of the user (resulting in relative changes in arrival time at the left and right ears), which is a function of the listener's head size and face shape.

Figure 2B:
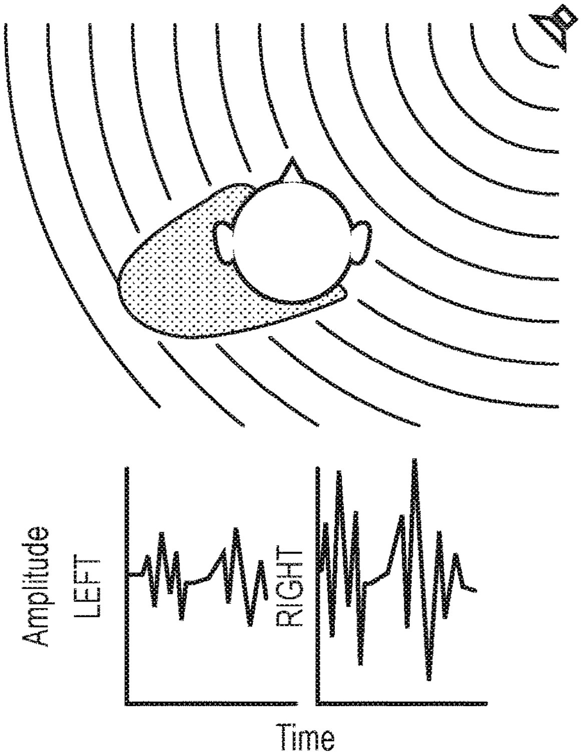

Similarly, referring to FIG. 2B, interaural level difference (ILD) relates to different loudness for left and right ears and is indicative of the degree to which a sound is positioned to the left right of the user (resulting in different degrees of attenuation due to the relative obscuring of the ear from the sound source), and again is a function of head size and face shape.

Figure 3A:
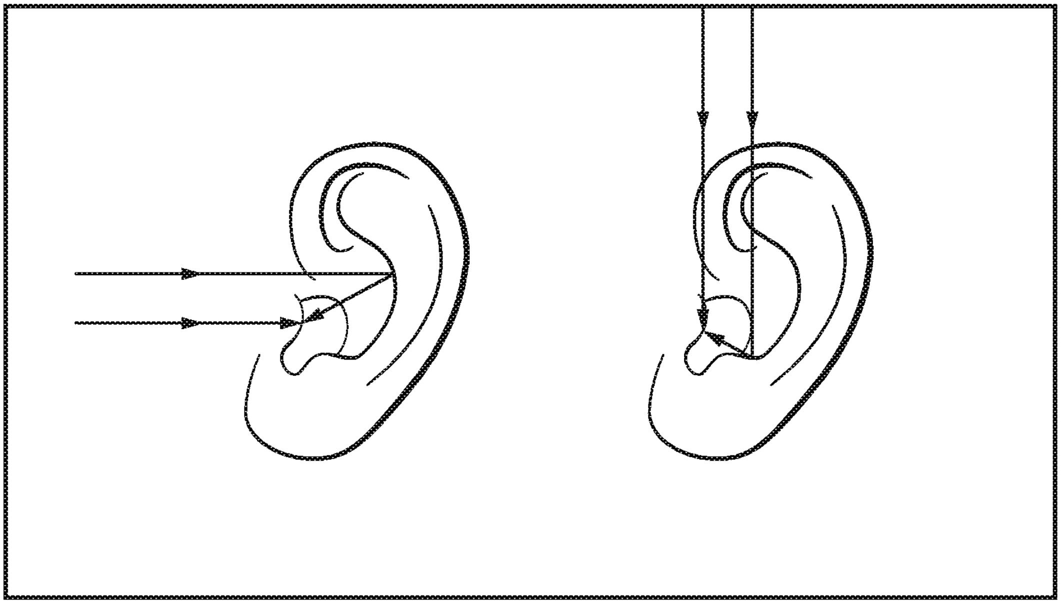
FIGS. 3A and 3B are schematic diagrams of ear related audio properties.
Figure 3B:
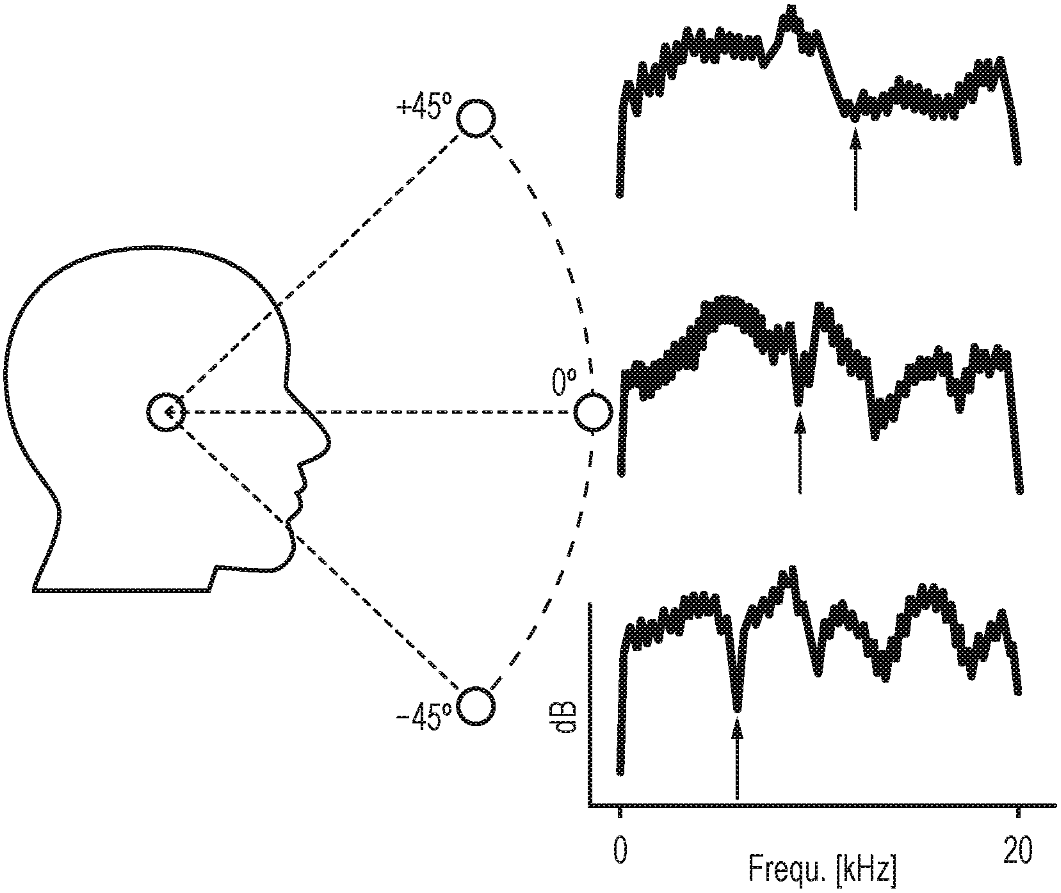

In addition to such horizontal (left-right) discrimination, referring also to FIG. 3A the outer ear comprises asymmetric features that vary between individuals and provide additional vertical discrimination for incoming sound; referring to FIG. 3B, the small difference in path lengths between direct and reflected sounds from these features cause so-called spectral notches that change in frequency as a function of sound source elevation.

Furthermore, these features are not independent; horizontal factors such as ITD and ILD also change as a function of source elevation, due to the changing face/head profile encountered by the sound waves propagating to the ears. Similarly, vertical factors such as spectral notches also change as a function of left/right positioning, as the physical shaping of the ear with respect to the incoming sound, and the resulting reflections, also change with horizontal incident angle.

The result is a complex two-dimensional response for each ear that is a function of monaural cues such as spectral notches, and binaural or inter-aural cues such as ITD and ILD. An individual's brain learns to correlate this response with the physical source of objects, enabling them to distinguish between left and right, up and down, and indeed forward and back, to estimate an object's location in 3D with respect to the user's head.

It would be desirable to provide a user with sound (for example using headphones) that replicated these features so as to create the illusion of in-game objects (or other sound sources in other forms of consumed content) being at specific points in space relative to the user, as in the real world. Such sound is typically known as binaural sound.

However, it will be appreciated that because each user is unique and so requires a unique replication of features, this would be difficult to do without extensive testing.

Figure 4A:
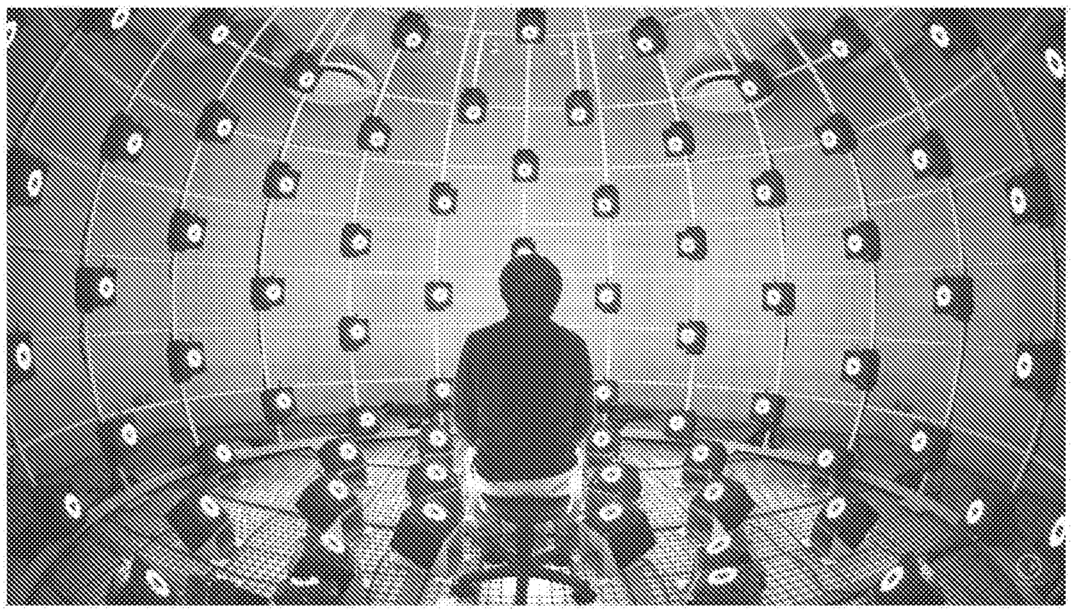
FIGS. 4A and 4B are schematic diagrams of audio systems used to generate data for the computation of a head related transfer function in accordance with embodiments of the present description.

In particular, it is necessary to determine the in-ear response of the user for a plurality of positions, for example in a sphere around them; FIG. 4A shows a fixed speaker arrangement for this purpose, whilst FIG. 4B shows a simplified system where, for example the speaker rig or the user can rotate by fixed increments so that the speakers successively fill in the remaining sample points in the sphere.

Figure 5:
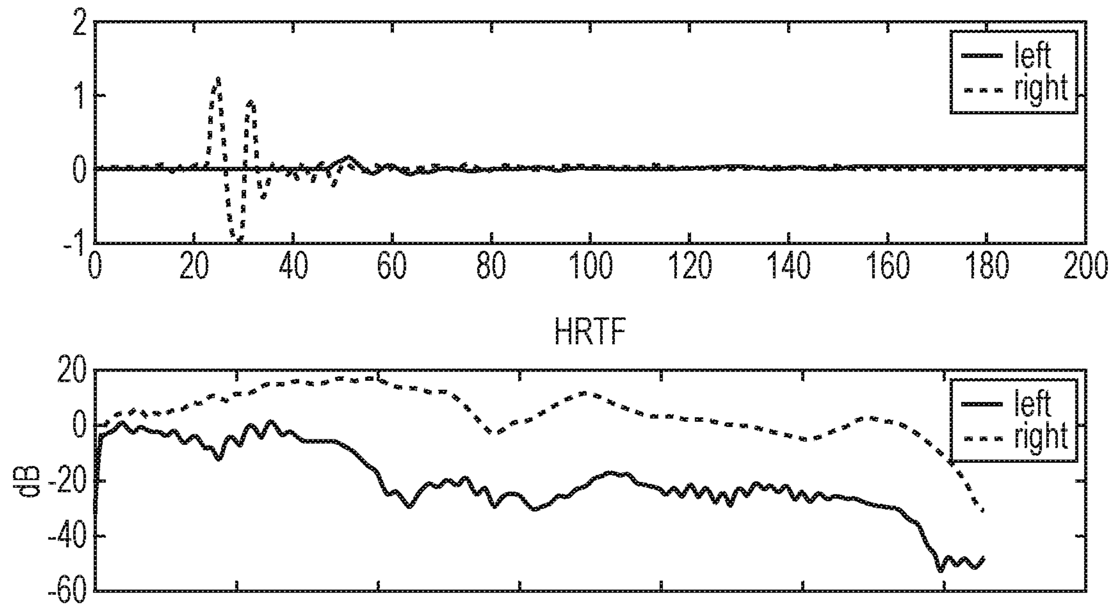
FIG. 5 is a schematic diagram of an impulse response for a user's left and right ears in the time and frequency domains.

Referring to FIG. 5, for a sound (e.g. an impulse such as a single delta or click) at each sampled position, a recorded impulse response within the ear (for example using a microphone positioned at the entrance to the ear canal) is obtained, as shown in the upper graph. A Fourier transform of these impulse responses result in a so-called head-related transfer function (HRTF) describing the effect for each ear of the user's head on the received frequency spectrum for that point in space.

Figure 6:
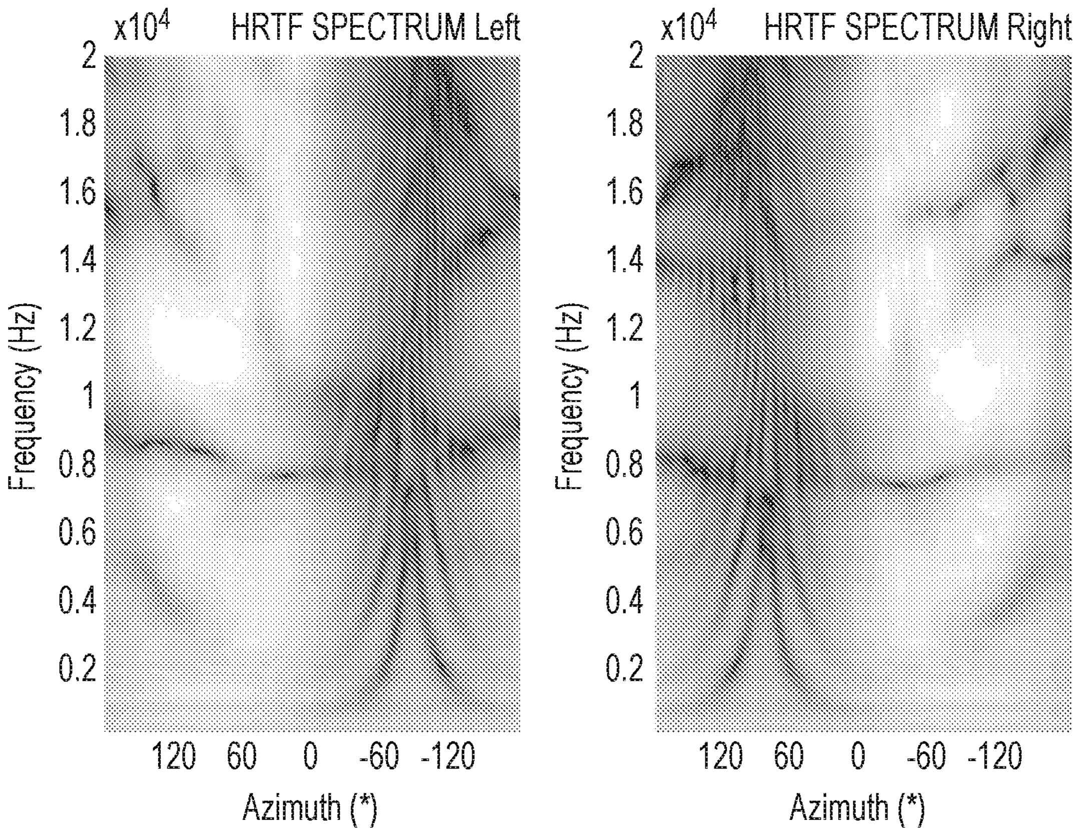
FIG. 6 is a schematic diagram of a head related transfer function spectrum for a user's left and right ears.

Measured over many positions, a full HRTF can be computed, as partially illustrated in FIG. 6 for both left and right ears (showing frequency on the y-axis versus azimuth on the x-axis). Brightness is a function of the Fourier transform values, with dark regions corresponding to spectral notches.

Figure 4B:
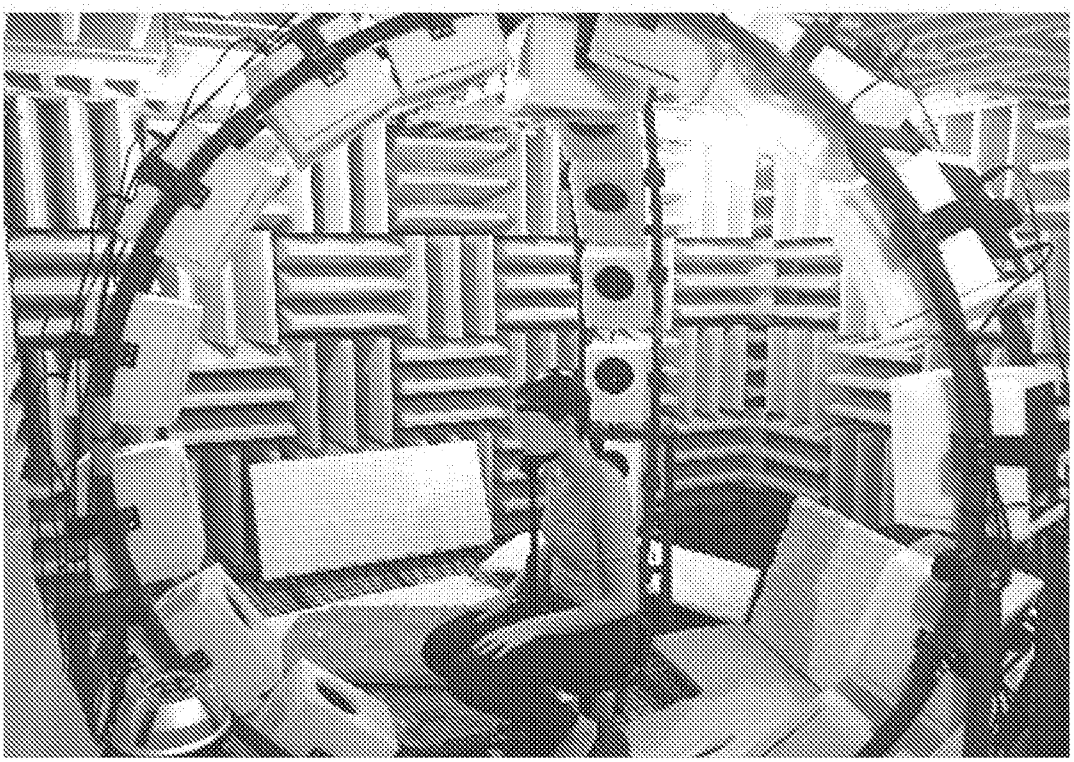

It will be appreciated that obtaining an HRTF for each of potentially tens of millions of users of an entertainment device using systems such as those shown in FIGS. 4A and 4B is impractical, as is supplying some form of array system to individual users in order to perform a self-test.

Accordingly, in embodiments of the present description, a different technique is disclosed.

In these embodiments, full HRTFs for a plurality of reference individuals are obtained using systems such as those shown in FIGS. 4A and 4B, to generate a library of HRTFs. This library may be may initially be small, with for example individual representatives of several ages, ethnicities and each sex being tested, or simply a random selection of volunteers, beta testers, quality assurance testers, early adopters or the like. However over time more and more individuals may be tested with their resulting HRTF being added to the library.

As well as the HRTF test, each of these individuals performs a calibration test, for example using the entertainment system described herein and headphones, or an HMD system (e.g. with headphones), or optionally a stereo or surround sound speaker system, and optionally two or more of these in succession.

The calibration test asks the user to identify where, within the space around them, a sound appears to come from. For a user wearing an HMD system, once a sound has been played the user can look in the direction they believed the sound to come from, and this direction can be measured (for example using head tracking and as appropriate gaze tracking techniques known in the art). Alternatively or in addition they can move a reticule or other indicator to the expected position using one or more handheld controllers. In this latter case, they may move the indicator to a position on screen corresponding to where the sound appeared to come from, or if the screen displays a notional position of the user surrounded by a sphere or partial sphere, they can use the controller(s) to move the indicator over the surface of that sphere to the notional position of the sound.

Alternatively or in addition other means of input may also be considered, such as a gestural input captured by camera (for example, pointing in the perceived direction from which the sound comes), which may then be used to determine the direction.

Equivalently, a location can be presented graphically to the user, and the user must then control the positioning of a source sound to that location; in this case, pointing or other direct controls would not be appropriate since this would not require the user to estimate the position of the sound source; rather, for example, a joystick or joypad control, or motion gestures (e.g. panning horizontally and/or vertically) could be used to move the sound source. This approach may be slower, however.

Hence more generally, the user must try to match a presented sound to a presented location, either by controlling the position of the presented sound or controlling the position of the presented location.

The individuals for whom a full HRTF is computed and added to the library perform this test (either identifying a location of a sound, or moving a sound to an identified location) using sounds transformed by a default HRTF (for example one computed using a dummy head) to generate default binaural sound signals.

Depending on how the morphology of the individual differs from that of the dummy head, the default HRTF used to drive the binaural sound in the headphones or speakers will differ from their own natural HRTF in different ways. This will in turn will affect their perception of where sound sources presented using the default HRTF actually are.

By testing a plurality of sound source locations in this manner, the individual's location estimations (in particular the degree of error of the location estimations) act as a proxy description for how their individual HRTF differs from the default HRTF. Such a proxy can also be thought of as a fingerprint for the full HRTF of the reference individual.

Subsequently, in embodiments of the present description, a user at home may perform the same calibration test. If more than one type of audio delivery means is supported, e.g. not just headphones (and/or an HMD system where this is treated as equivalent to headphones) then optionally the user will indicate the type of audio system they are using (for example stereo or surround sound loudspeakers, or headphones, or an HMD system with built-in headphones). This affects the form of the default HRTF used (headphone, surround sound etc.) and also the subset of proxy results for the reference individuals in the library that are to be compared with the results of the user at home.

The user at home may then perform the same calibration test as the reference individuals (either identifying a location of a sound, or moving a sound to an identified location, for a set of locations) to estimate the position of sounds sources presented to them using the default HRTF.

The closest pattern of location estimation errors in the set of proxy results is then taken to indicate the closest matching HRTF in the library to the real HRTF of the user.

This indicated closest matching HRTF may then be installed as the HRTF for that user on the entertainment device, thereby providing a more realistic and accurate binaural sound for the user.

Furthermore, the user's location estimations for the test sounds can be kept on record; if a new reference individual is added to the library, the user's location estimations can be tested against those of the new reference individual to see if they are a better match, for example as a background service provided by a remote server. If a better match is found, then the better indicated closest matching HRTF may be installed as the HRTF for that user, thereby improving their experience further.

In this way, an HRTF for a user of an entertainment device can be estimated without, for example, placing a microphone within the user's ear canal, or measuring any impulse responses.

Advantageously this enables potentially tens of millions of users to enjoy good binaural sound, with the quality of that sound being improved as new reference individuals are added to the HRTF library.

The individuals chosen to expand the library can also be selected judiciously; one may assume that for a representative set of reference individuals, a random distribution of the users will map to each reference individual in roughly equal proportions; however if a comparatively high number of users map to a reference individual (for example above a threshold variance in the number of users mapping to reference individuals), then this is indicative of at least one of the following:

The population of users is not random (e.g. due to demographics), and so there are more people similar to this reference individual than the norm; and The set of reference individuals is not sufficiently representative of the users and there is a gap in the proxy result space surrounding this particular reference individual, causing people who in fact are not that similar to the individual to be mapped to them for lack of a better match.

In either case, it would be desirable to find other reference individuals who are morphologically similar to the one currently in the library, in order to provide more refined discrimination within this sub-group of the user population. Such individuals may optionally be found for example by comparing photographs of the candidate individual, for example face-on and side on (showing an ear) to help with automatically assessing head shape and out ear shape. Such individuals may also be found using other methods, such as identifying individuals with similar demographics, or inviting close family relatives of the existing individual.

In this way, optionally the HRTF library can be grown over time in response to the characteristics of the user base.

Where it is not possible to find a suitable new reference individual, or whilst waiting for one to be added to the library, optionally for a user that is close to 2 or more reference individuals but nor within a threshold degree of match of any of them, optionally a blend of the HRFTs of the 2 or more reference individuals may be generated to provide a better estimate of their own HRTF. This blend may be a weighted average or other combination responsive to the relative degree of match (e.g. proximity in location error space for a vector of error values of location estimates) for 2 or more reference individual's HRTFs.

Optionally, as the library grows, and as the user base grows, the library may be pre-filtered for a given user according to demographic criteria; for example according to one or more of age, sex, and ethnicity. The set of reference individuals and hence also calibration test results to compare can then be reduced to a subset who match these basic demographics. Subsequently, only if the best match of location estimations for a user still differs from those of the respective reference individual by a threshold amount, will the user be compared to the full corpus of reference individuals' proxy results. This may therefore reduce computational overhead for a server performing these comparisons, whilst also enabling people who do not sit squarely within their expected demographic (e.g. a child with a relative large head, or an adult with a relatively small one) to still find a good match within the wider library of reference individuals.

The above description assumes that a full calibration test is performed by the home user. A full calibration test may comprise localising sounds at a large number of positions, typically over the surface of a sphere or partial sphere, thereby capturing the impact of the interconnected relationship between the horizontal and vertical audio features of ITD, ILD and spectral notches discussed previously on the user's ability to estimate the location of objects whose sound has been processed using the default HRTF.

The full calibration test may be performed over a uniform grid of positions, or a non-linear distribution for example favouring sounds within the user's normal field of few over those just outside it, in turn over those to the far left and right, again in turn over those behind the user, so that the testing position density appears to disperse from a region in front of the user's resting line of sight to become most sparse behind them.

The full calibration test may also concentrate on areas known to have particularly variable properties; one may consider that if a number of HRTF sets of the type shown in FIG. 6 were averaged (for example for reference individuals of a similar type, e.g. age, gender, ethnicity, or where available based on other physiological measurements such as head size (or a proxy such as hat size or a sensed HMD fitting circumference), then there would be regions of individual transfer functions that differed more than others, or to put it another way, a corresponding variance map showing where there is scope for greater discrimination in the calibration test.

Consequently there are likely to be regions in space where reference individuals tend to show larger estimation errors (e.g. variability above a threshold); for these reference individuals, additional tests in nearby locations may provide useful additional differentiation between them.

Similarly when users are tested, if large errors above such a threshold are identified, then corresponding additional tests in nearby locations may be used to improve the selection of a corresponding reference individual's results and hence HRTF. In addition, locations corresponding to large errors, or errors that appear to be an outlier with respect to a candidate reference individual, can be revisited to see if the error is consistent and repeatable. If it is consistent then it can be retained and may be treated as significant (e.g. to prompt adding another reference individual, including possibly inviting the current user). If not consistent then the location may be fully or partially discounted when searching the corresponding results of reference individuals.

In this way the search space of the calibration test can be quickly improved.

Meanwhile, tests at broad frequency ranges (e.g. bursts of white noise, or pops and bangs) can be useful for some properties (e.g. some notch measures), whilst tests at narrower frequency ranges can be useful for others; e.g. pink noise below around 1.5 kHz may be more useful for ITD based estimates, whilst blue noise above 1.5 kHz may be more useful for ILD based estimates. Other sounds such as chirps or pure tomes may similarly be used, as may natural sounds such as speech utterances, music or ambience noises. Hence a mix of wide and narrow band sounds may be used in the calibration to better distinguish and characterise the impact of different aspects of the user's hearing on their location estimates.

The calibration test typically randomises the choice of individual test location within a predetermined set of locations to test, so that neither reference individuals nor home users learn patterns of progression within the audio positions.

It will be appreciated however that a full calibration test may take a long time, and be unwelcome or impractical to a home user. However, it will also be appreciated that the test can be performed incrementally, with additional test points adding to the proxy result for the user and improving the potential accuracy of matches with the proxies for the reference individuals.

Hence aspects of the test can be prioritised, or performed in a preferential order, and refined with more data over any successive calibrations.

For example, measuring centreline elevation estimates can provide a first estimate of the elevation notch for the user's ears (or more precisely, a pattern of position estimation errors characteristic of that notch). Similarly, measuring centreline horizontal positions can provide a first estimate for the ITD and/or ILD of the user (or more precisely, a pattern of estimation errors characteristic of these).

These test positions can again be randomised, either within just the vertical or horizontal ranges, or between both, or within a set of tests comprising a similar number of other predetermined locations off these lines.

The user results of this initial calibration test can be compared with just the corresponding initial results for the proxies of the reference individuals to find an initial closest match. The corresponding HRTF is still likely to provide a better experience for the user than the default.

The user can then revisit the calibration test at different times to continue the test and so populate their set of proxy results. The test locations can again prioritise certain locations likely to provide particular discrimination for a given spectral notch, or provide ITD and/or ILD measurements across subsequent elevations.

The user can re-do the calibration test as they wish; for example a growing child may wish to do so annually as their head shape changes as they grow. Similarly an older individual may re-take the calibration test if they suspect some hearing loss in either ear.

Figure 7:
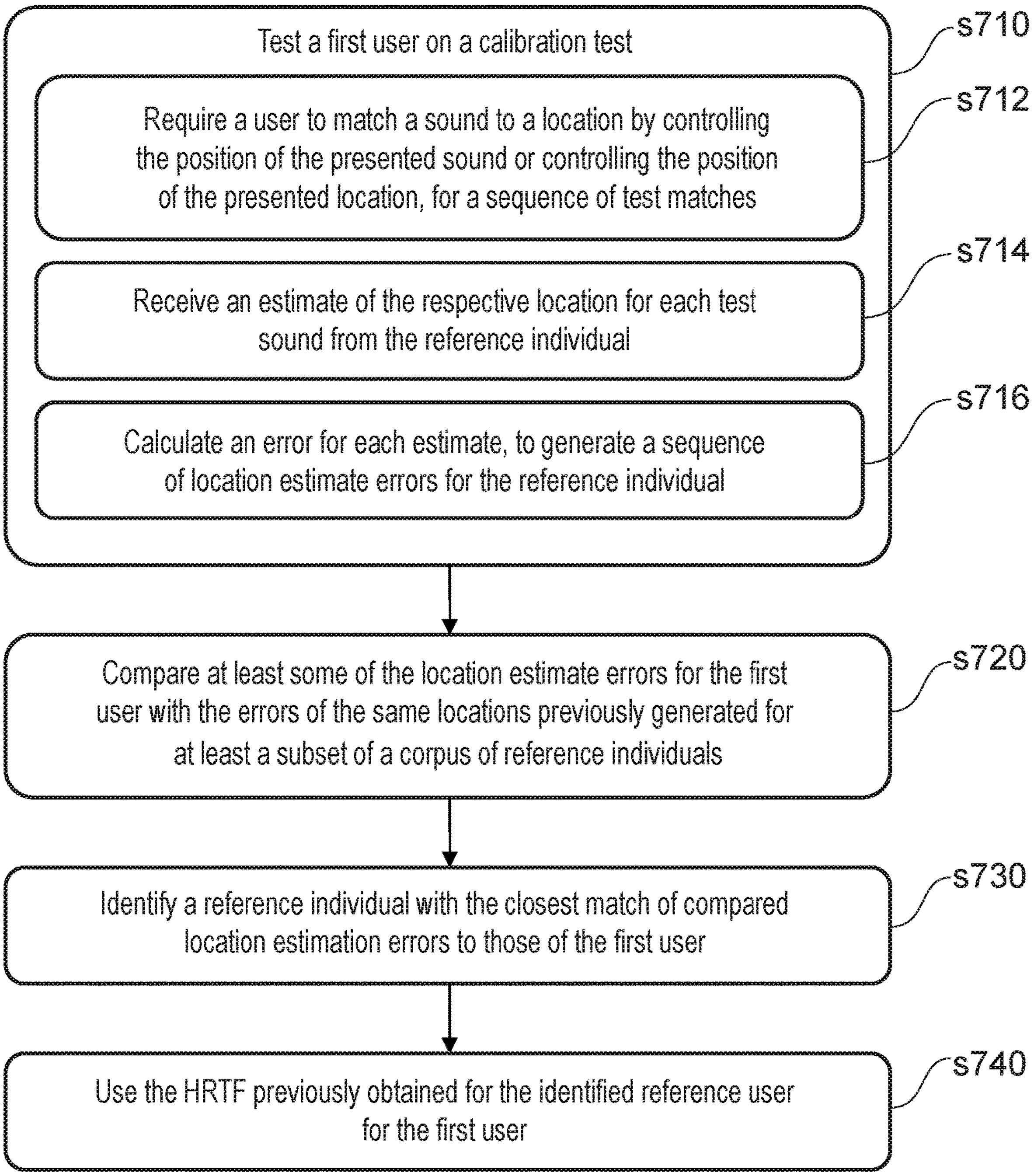
FIG. 7 is a flow diagram of a method of audio personalisation for a first user in accordance with embodiments of the present description.
Figure 8:
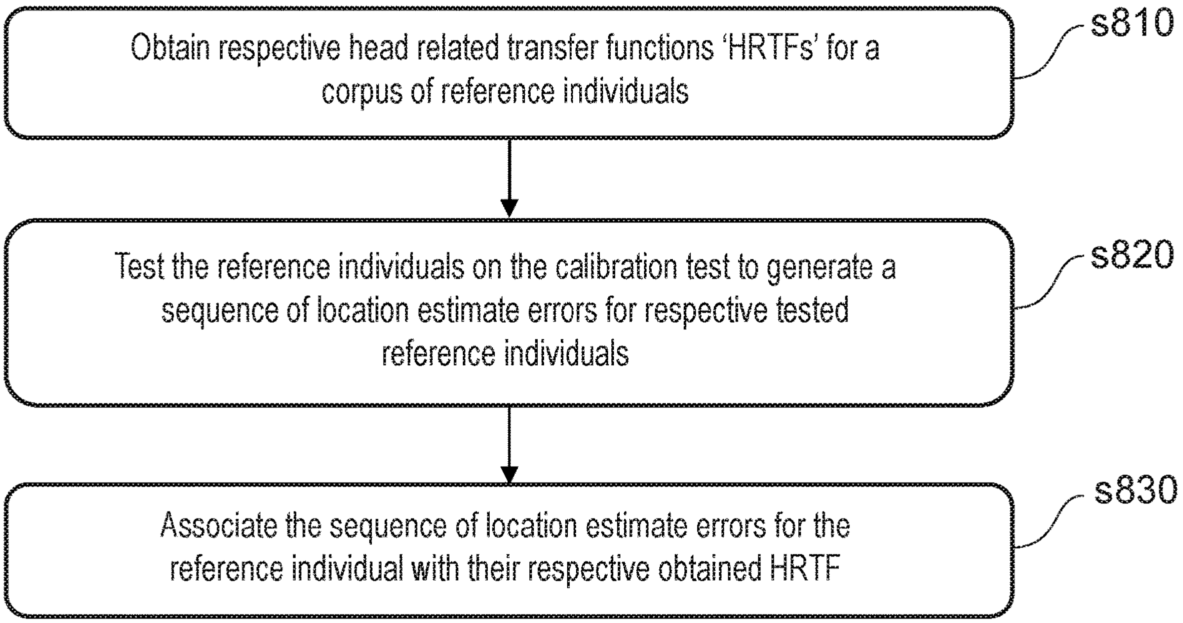
FIG. 8 is flow diagram of a method of audio personalisation for reference individuals in accordance with embodiments of the present description.

Referring now also to FIGS. 7 and 8, in a summary embodiment of the present description, an audio personalisation method for reference individuals thus comprises the following steps.

In a first step s810, obtaining respective head related transfer functions 'HRTFs' for a corpus of reference individuals, as described elsewhere herein.

In a second step s820, testing respective reference individuals on a calibration test. As noted elsewhere herein, the calibration test typically comprises requiring a respective tested reference individual to match a test sound to a test location, either by controlling the position of the presented sound or controlling the position of the presented location, for a sequence of test matches as described elsewhere herein (for example by presenting a sequence of test sounds which may be the same type, or differ according to a predetermined scheme), each test sound being presented at a position using a default head related transfer function 'HRTF', receiving an estimate of each matching location from the respective tested reference individual as described elsewhere herein (for example by receiving an estimate of the respective location for each test sound from the reference individual, or a final chosen position for the respective sound estimated to coincide with each test location), and calculating a respective location error for each estimate (e.g. difference between estimated location and sound position, or positioned sound source and location), to generate a sequence of location estimate errors for the respective tested reference individual, as described elsewhere herein.

Then in a third step s830, associating the sequence of location estimate errors for the reference individual with their respective obtained HRTF, as described elsewhere herein.

Meanwhile in a summary embodiment of the present description, an audio personalisation method for a first user comprises the following steps:

A first step s710 comprises testing a first user on a calibration test, as described elsewhere herein.

The calibration test in turn comprises substep s712 of requiring a user to match a test sound to a test location, either by controlling the position of the presented sound or controlling the position of the presented location, for a sequence of test matches as described elsewhere herein (for example by presenting a sequence of test sounds which again may be the same type, or differ according to a predetermined scheme), each test sound being presented at a position using a default head related transfer function 'HRTF', substep s714 receiving an estimate of each matching location from the first user as described elsewhere herein (for example by receiving an estimate of the respective location for each test sound from the first user, or a final chosen position for the respective sound estimated to coincide with each test location), and substep s716 of calculating a respective error for each estimate (e.g. difference between user estimated location and sound position, or user positioned sound source and location), to generate a sequence of location estimate errors for the first user, as described elsewhere herein.

A second step s720 then comprises comparing at least some of the location estimate errors for the first user with estimate errors of the same locations previously generated for at least a subset of a corpus of reference individuals, as described previously herein.

A third step s730 then comprises identifying a reference individual with the closest match of compared location estimation errors to those of the first user, as described previously herein.

Then a fourth step s740 comprises using an HRTF, previously obtained for the identified reference individual, for the first user, as described previously herein.

It will be appreciated that typically the method relating to the reference individuals is performed by a provider of a videogame console or other content playback device, or a provider of system software for such consoles or devices, or a provider of an audio toolkit for software developers for such consoles or devices, whilst the method relating to the first user is performed for the first user using their own console or other content playback device.

Consequently the methods can be employed independently, although the method relating to the first user assumes that the method relating to reference individuals has been implemented at least to the extent that some HRTFs and location estimate error sets for some reference individuals exist.

However it will also be appreciated that the two methods can also be considered part of a single wider method, e.g. of mass user audio configuration.

It will be apparent to a person skilled in the art that variations in the above methods corresponding to operation of the various embodiments of the method and/or apparatus as described and claimed herein are considered within the scope of the present disclosure, including but not limited to:

Occasionally re-comparing users with the corpus as it grows, as described elsewhere herein; hence if a predetermined number of reference individuals are added to the corpus, for whom an HRTF and associated sequence of location estimate errors are available, then comparing at least some of the location estimate errors for the first user with the estimate errors of the same location for at least a subset of the corpus of additional reference individuals; and if an additional reference individual has a closer match of compared location estimation errors to those of the first user than the currently identified reference individual, then using the HRTF obtained for that additional reference user for the first user, as described elsewhere herein;

- the subset of the corpus being selected responsive to demographic details of the first user and the reference individuals, as described elsewhere herein;
- the respective locations comprising at least a subset of locations selected due to having at least a threshold variance in location estimation errors for a subset of reference individuals, as described elsewhere herein;
- respective sounds used in the calibration test comprise one or more selected from the list consisting of narrowband sounds, broadband sounds, impulse sounds, tones, chirps, and speech, as described elsewhere herein;
- for a calibration test, respective locations being selected from a set of predetermined locations in a predetermined series of subsets, as described elsewhere herein;
- in this case, optionally a subset comprising locations on a horizontal centreline and a subset comprising locations on a vertical centreline are included within the first N subsets in the a predetermined series of subsets, where N is between 2 and 5, as described elsewhere herein;

Similarly in this case, optionally the steps of s720 comparing, s730 identifying and s740 using are performed after a predetermined number of subsets has been completed within the predetermined series of subsets, as described elsewhere herein;

In this case, optionally if the first user subsequently takes the calibration test using a predetermined number of subsequent subsets of the predetermined series of subsets, the steps of comparing, identifying and using are performed again, as described elsewhere herein;

- for a calibration test, respective locations being selected randomly from at least a subset of predetermined locations (which may comprise one or more subsets from a predetermined series of subsets), as described elsewhere herein;
- if a first reference individual is identified as the best match for users by a threshold amount more than other reference individuals, then an additional reference individual being selected having morphological similarities to the first reference individual within a predetermined tolerance, as described elsewhere herein; and
- if no single reference individual has a match of compared location estimation errors to those of the first user within a predetermined threshold level of matches, the method comprises blending the HRTFs of the closest M matching reference individuals, where M is a value of two or more, and using the blended HRTF for the first user, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Whilst the data needed to calculate an HRTF may be specialist equipment such as that shown in FIGS. 4A and 4B, the device used to perform the calibration tests, and preform steps such as associating location estimation errors with individuals and/or HRTFs, comparing results, identifying best matches, and using a corresponding HRTF may be a videogame console such as the PS4® or PS5®, or an equivalent development kit, PC or the like.

Hence in a summary embodiment, an audio personalisation system for a first user may be an entertainment device 10, comprising:

- a testing processor (for example CPU 20A) configured (for example by suitable software instruction) to test a first user on a calibration test, the calibration test comprising requiring a user to match a test sound to a test location, either by controlling the position of the presented sound or controlling the position of the presented location, for a sequence of test matches as described elsewhere herein (for example by presenting a sequence of test sounds which again may be the same type, or differ according to a predetermined scheme), each test sound being presented at a position using a default head related transfer function 'HRTF', receiving an estimate of each matching location from the first user as described elsewhere herein (for example by receiving an estimate of the respective location for each test sound from the first user), and calculating a respective error for each estimate, to generate a sequence of location estimate errors for the first user, as described elsewhere herein;
- a comparison processor (for example CPU 20A) configured (for example by suitable software instruction) to cause a comparison of at least some of the location estimate errors for the first user with estimate errors of the same locations previously generated for at least a subset of a corpus of reference individuals; the comparison processor also being configured (for example by suitable software instruction) to identify a reference individual with the closest match of compared location estimation errors to those of the first user, as described elsewhere herein; and
- an HRTF processor (for example CPU 20A) configured (for example by suitable software instruction) to use an HRTF, previously obtained for the identified reference individual, for the first user, as described elsewhere herein.

It will be appreciated for example that the role of the comparison processor may be split between the entertainment device and a remote server that also holds the location estimate errors for the corpus of reference individuals. Hence within the entertainment device the comparison processor is configured to cause a comparison that may be performed either locally (e.g. by performing the comparison) or remotely (e.g. by sending location estimate errors for the first user to the server and requesting a comparison).

Similarly it will be appreciated that the HRTF processor may receive the appropriate HRTF data from such a remote server.

Similarly in a summary embodiment, an audio personalisation system for reference individuals may be an entertainment device 10, or equivalently a development kit or server, comprising:

Storage (such as HDD 37 in conjunction with CPU 20A) configured (for example by suitable software instruction) to store respective head related transfer functions 'HRTFs' for a corpus of reference individuals;

- a testing processor (for example CPU 20A) configured (for example by suitable software instruction) to test respective reference individuals on a calibration test, the calibration test comprising requiring a respective tested reference individual to match a test sound to a test location, either by controlling the position of the presented sound or controlling the position of the presented location, for a sequence of test matches as described elsewhere herein (for example by presenting a sequence of test sounds which may be the same type, or differ according to a predetermined scheme), each test sound being presented at a position using a default head related transfer function 'HRTF', receiving an estimate of each matching location from the respective tested reference individual as described elsewhere herein (for example by receiving an estimate of the respective location for each test sound from the reference individual, or a final chosen position for the respective sound estimated to coincide with each test location), and calculating a respective location error for each estimate (e.g. difference between estimated location and sound position, or positioned sound source and location), to generate a sequence of location estimate errors for the respective tested reference individual, as described elsewhere herein; and
- an association processor (for example CPU 20A) configured (for example by suitable software instruction) to associating the sequence of location estimate errors for the reference individual with their respective obtained HRTF.

It will be appreciated that the calibration test for the first user and the reference individuals is typically the same.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An audio personalisation method for a first user, comprising the steps of:

testing the first user on a calibration test, the calibration test comprising:

requiring a tested individual to match a test sound to a test location, either by controlling a position of the test sound or controlling the position of the test location, for a sequence of test matches, each test sound being presented at a specified position using a default head related transfer function 'HRTF', receiving an estimate of each matching location from the first user, and calculating a respective error for each estimate, to generate a sequence of location estimate errors for the first user; and comparing at least some of the location estimate errors for the first user with estimate errors of the same locations previously generated for at least a subset of a corpus of reference individuals;

identifying a reference individual with the closest match of compared location estimation errors to those of the first user; and using an HRTF, previously obtained for the identified reference individual, for the first user.

2. An audio personalisation method for reference individuals, comprising the steps of:

obtaining respective head related transfer functions 'HRTFs' for a corpus of reference individuals;

testing respective reference individuals on a calibration test, the calibration test comprising:

requiring a reference individual to match a test sound to a test location, either by controlling a position of the test sound or controlling the position of the test location, for a sequence of test matches, each test sound being presented at a specified position using a default head related transfer function 'HRTF', receiving an estimate of each matching location from the reference individual, and calculating a respective error for each estimate, to generate a sequence of location estimate errors for the respective tested reference individual; and associating the sequence of location estimate errors for the reference individual with their respective obtained HRTF.

3. An audio personalisation method according to claim 1, in which if a predetermined number of reference individuals are added to the corpus, for whom an HRTF and associated sequence of location estimate errors are available, then comparing at least some of the location estimate errors for the first user with the estimate errors of the same location for at least a subset of the corpus of additional reference individuals; and if an additional reference individual has a closer match of compared location estimation errors to those of the first user than the currently identified reference individual, then using the HRTF obtained for that additional reference user for the first user.

4. An audio personalisation method according to claim 1, in which the subset of the corpus is selected responsive to demographic details of the first user and the reference individuals.

5. An audio personalisation method according to claim 1, in which the respective locations comprise at least a subset of locations selected due to having at least a threshold variance in location estimation errors for a subset of reference individuals.

6. An audio personalisation method according to claim 1, in which respective sounds used in the calibration test comprise one or more of:

i. narrowband sounds;

ii. broadband sounds;

iii. impulse sounds;

iv. tones;

v. chirps; and vi. speech.

7. An audio personalisation method according to claim 1, in which for a calibration test: respective locations are selected from a set of predetermined locations in a predetermined series of subsets.

8. An audio personalisation method according to claim 7, in which a subset comprising locations on a horizontal centreline and a subset comprising locations on a vertical centreline are included within first N subsets in the predetermined series of subsets, where N is between 2 and 5.

9. An audio personalisation method according to claim 7, in which the steps of comparing at least some of the location estimate errors for the first user with the corresponding estimate errors for at least a subset of the corpus of reference individuals, identifying a reference individual with the closest match of compared location estimation errors to those of the first user, and using the HRTF obtained for the identified reference user for the first user, are performed after a predetermined number of subsets has been completed within the predetermined series of subsets.

10. An audio personalisation method according to claim 9, in which if the first user subsequently takes the calibration test using a predetermined number of subsequent subsets of the predetermined series of subsets, the steps of comparing, identifying and using are performed again.

11. An audio personalisation method according to claim 1, in which for a calibration test: respective locations are selected randomly from at least a subset of predetermined locations.

12. An audio personalisation method according to claim 1, in which if a first reference individual is identified as the best match for users by a threshold amount more than other reference individuals, then an additional reference individual is selected having morphological similarities to the first reference individual within a predetermined tolerance.

13. An audio personalisation method according to claim 1, in which if no single reference individual has a match of compared location estimation errors to those of the first user within a predetermined threshold level of matches, the method comprises blending the HRTFs of closest M matching reference individuals to generate a blended HRTF, where M is a value of two or more; and using the blended HRTF for the first user.

14. A non-transitory, computer-readable storage medium containing a computer program comprising computer executable instructions, which when executed by a computer system, cause the computer system to perform an audio personalisation method for a first user, comprising the steps of:

testing the first user on a calibration test, the calibration test comprising:

requiring a tested individual to match a test sound to a test location, either by controlling a position of the test sound or controlling the position of the test location, for a sequence of test matches, each test sound being presented at a specified position using a default head related transfer function 'HRTF', receiving an estimate of each matching location from the first user, and calculating a respective error for each estimate, to generate a sequence of location estimate errors for the first user; and comparing at least some of the location estimate errors for the first user with estimate errors of the same locations previously generated for at least a subset of a corpus of reference individuals;

identifying a reference individual with the closest match of compared location estimation errors to those of the first user; and using an HRTF, previously obtained for the identified reference individual, for the first user.

15. An audio personalisation system for a first user, comprising a testing processor configured to test the first user on a calibration test, the calibration test comprising:

requiring a tested individual to match a test sound to a test location, either by controlling a position of the test sound or controlling the position of the test location, for a sequence of test matches, each test sound being presented at a specified position using a default head related transfer function 'HRTF', receiving an estimate of each matching location from the first user, and calculating a respective error for each estimate, to generate a sequence of location estimate errors for the first user; and a comparison processor configured to cause a comparison at least some of the location estimate errors for the first user with estimate errors of the same locations previously generated for at least a subset of a corpus of reference individuals;

the comparison processor being configured to identify a reference individual with the closest match of compared location estimation errors to those of the first user; and an HRTF processor configured to use an HRTF, previously obtained for the identified reference individual, for the first user.

16. An audio personalisation system for reference individuals, comprising storage configured to store respective head related transfer functions 'HRTFs' for a corpus of reference individuals, a testing processor configured to testing respective reference individuals on a calibration test, the calibration test comprising:

requiring a reference individual to match a test sound to a test location, either by controlling position of the test sound or controlling the position of the test location, for a sequence of test matches, each test sound being presented at a specified position using a default head related transfer function 'HRTF', receiving an estimate of each matching location from the reference individual, and calculating a respective error for each estimate, to generate a sequence of location estimate errors for the respective tested reference individual; and an association processor configured to associating the sequence of location estimate errors for the reference individual with their respective obtained HRTF.

* * * * *